(12) United States Patent
Musick

(10) Patent No.: US 9,583,930 B2
(45) Date of Patent: Feb. 28, 2017

(54) CONDUCTOR GROMMET ASSEMBLY

(71) Applicant: Marcus M. Musick, Columbus, GA (US)

(72) Inventor: Marcus M. Musick, Columbus, GA (US)

(*) Notice: Subject to any disclaimer, the term of this patent is extended or adjusted under 35 U.S.C. 154(b) by 37 days.

(21) Appl. No.: 14/632,790

(22) Filed: Feb. 26, 2015

(65) Prior Publication Data

US 2016/0254079 A1    Sep. 1, 2016

(51) Int. Cl.
*H02G 3/22* (2006.01)
*G05F 1/10* (2006.01)

(52) U.S. Cl.
CPC .............. *H02G 3/22* (2013.01); *G05F 1/10* (2013.01)

(58) Field of Classification Search
USPC ....................................... 174/153 G
See application file for complete search history.

(56) References Cited

U.S. PATENT DOCUMENTS

| | | | |
|---|---|---|---|
| 2,746,715 A | 5/1956 | Sherrod | |
| 4,525,000 A * | 6/1985 | Bachle | H02G 3/0675 174/653 |
| 4,808,774 A * | 2/1989 | Crane | H02G 3/083 174/135 |
| 4,946,137 A | 8/1990 | Adamczek | |
| 4,951,923 A | 8/1990 | Couture | |
| D318,784 S | 8/1991 | Tamm | |
| 5,236,177 A | 8/1993 | Tamm | |
| 5,271,605 A | 12/1993 | Damron | |
| 5,504,973 A * | 4/1996 | Kameyama | H02G 3/22 16/2.1 |
| 6,081,964 A * | 7/2000 | Mori | B60R 16/0222 16/2.2 |
| 6,302,379 B1 | 10/2001 | Walters | |
| 6,340,271 B1 | 1/2002 | Carlson et al. | |
| 6,354,651 B1 * | 3/2002 | Mori | B60R 16/0222 174/152 G |
| 6,479,748 B2 * | 11/2002 | Mori | B60R 16/0222 16/2.1 |
| 6,682,051 B2 | 1/2004 | Sigrist | |
| 6,883,783 B1 | 4/2005 | Quittschreiber | |
| 7,423,223 B2 * | 9/2008 | Taira | B60S 1/48 16/2.1 |

* cited by examiner

*Primary Examiner* — Dhirubhai R Patel

(57) ABSTRACT

A conductor grommet assembly for allowing a conductor to be easily passed through a surface includes a grommet that may be positioned in a support surface. The grommet may have at least one conductor passed therethrough such that the at least one conductor passes through the support surface. A bearing apparatus is coupled to the grommet. The bearing apparatus engages the conductor thereby reducing a friction of the conductor against the grommet as the conductor is fed through the grommet.

7 Claims, 3 Drawing Sheets

CONDUCTOR GROMMET ASSEMBLY

BACKGROUND OF THE DISCLOSURE

Field of the Disclosure

The disclosure relates to grommet devices and more particularly pertains to a new grommet device for allowing a conductor to be easily passed through a surface.

SUMMARY OF THE DISCLOSURE

An embodiment of the disclosure meets the needs presented above by generally comprising a grommet positioned in a support surface. The grommet may have at least one conductor passed therethrough such that the at least one conductor passes through the support surface. A bearing apparatus is coupled to the grommet. The bearing apparatus engages the conductor thereby reducing a friction of the conductor against the grommet as the conductor is fed through the grommet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
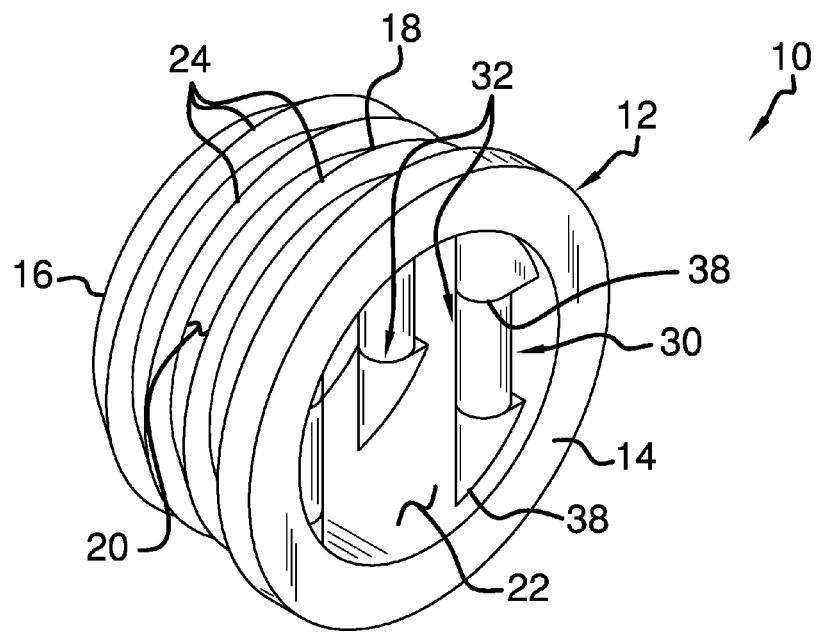
FIG. 1 is a front perspective view of a conductor grommet assembly according to an embodiment of the disclosure.
Figure 2:
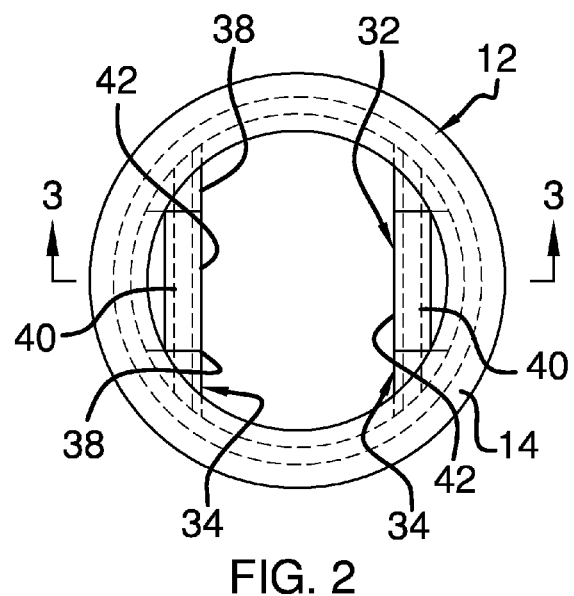
FIG. 2 is a front view of an embodiment of the disclosure.
Figure 3:
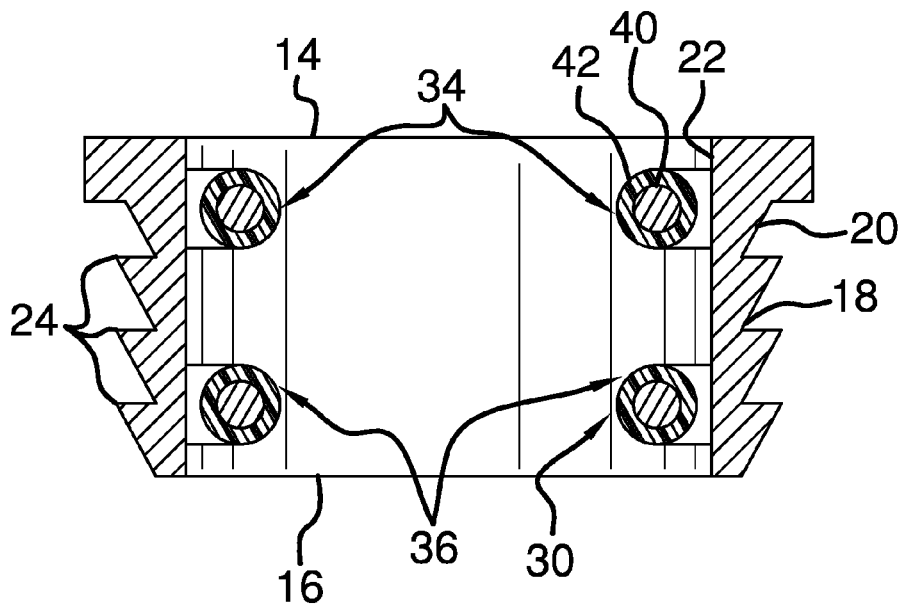
FIG. 3 is a cross sectional view taken along line 3-3 of FIG. 2 of an embodiment of the disclosure.
Figure 4:
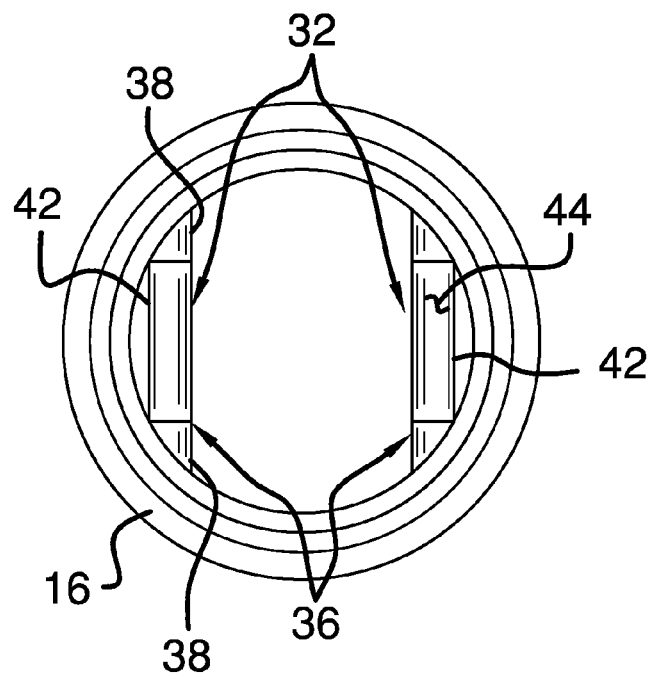
FIG. 4 is a back view of an embodiment of the disclosure.
Figure 5:
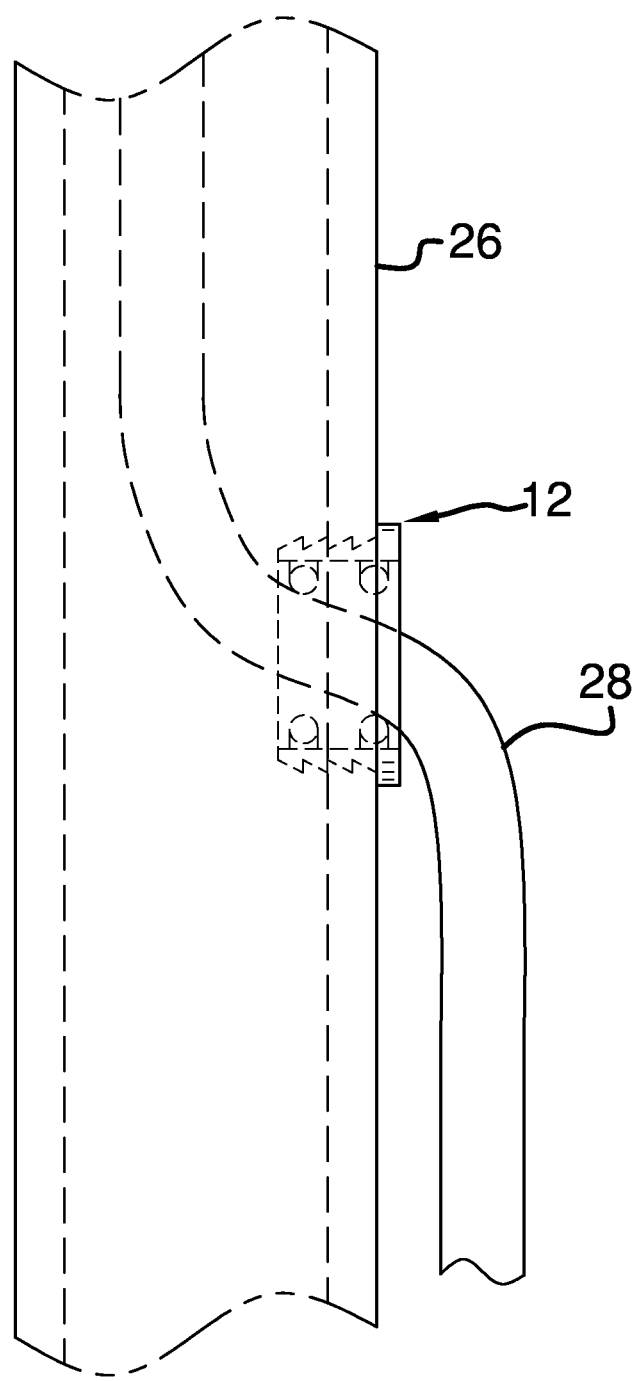
FIG. 5 is a perspective in-use view of an embodiment of the disclosure.

With reference now to the drawings, and in particular to FIGS. 1 through 5 thereof, a new grommet device embodying the principles and concepts of an embodiment of the disclosure and generally designated by the reference numeral 10 will be described.

As best illustrated in FIGS. 1 through 5, the conductor grommet assembly 10 generally comprises a grommet 12 that has a front side 14, a back side 16 and a peripheral wall 18 extending therebetween and each of the front side 14 and the back side 16 are open. The grommet 12 is substantially hollow and the peripheral wall 18 has an outer surface 20 and an inner surface 22. The outer surface 20 has a plurality of ridges 24 extending outwardly from the outer surface 20 and each of the ridges 24 is continuous and extends around the outer surface 20. The ridges 24 are spaced apart from each other between the front side 14 and the back side 16.

The grommet 12 is positioned in a support surface 26 such that the front side 14 and the back side 16 are each generally aligned with one of an inside surface 22 and an exterior surface 24 of the support surface 26 respectively. The ridges 24 engage the support surface 26 such that the grommet 12 is retained in the support surface 26 and the grommet 12 may have at least one conductor 28 passed therethrough such that the at least one conductor 28 passes through the support surface 26. The at least one conductor 28 may be an electrical wire or the like. The support surface 26 may be a wall of a building, on outer wall of a pipe or other structure that the at least one conductor 28 is be passed through.

A bearing apparatus 30 is coupled to the grommet 12 to engage the at least one conductor 28 thereby reducing a friction of the at least one conductor 28 against the grommet 12 as the at least one conductor 28 is fed through the grommet 12. The bearing apparatus 30 comprises a plurality of rollers 32 and each of the rollers 32 is coupled to the inner surface 22 of the peripheral wall 18. The rollers 32 comprise a first set of rollers 34 and a second set of rollers 36. The first set of rollers 34 is positioned adjacent to the front side 14 and each of the first set of rollers 34 is evenly spaced apart from and positioned on opposite sides of a longitudinal axis bisecting the grommet 12. The second set of rollers 36 is positioned adjacent to the back side 16 and each of the second set of rollers 36 is evenly spaced apart from and positioned on opposite side of the longitudinal axis.

Each of the rollers 32 includes a pair of couplers 38 that are spaced apart from and aligned with each other. A shaft 40 is attached between the pair of couplers 38 and a sleeve 42 is rotatably positioned around the shaft 40 and extends between the couplers 38. The sleeve 42 has an outer surface 44 and the outer surface 44 engages the at least one conductor 28 such that the sleeve 42 rotates on the shaft 40 when the at least one conductor 28 is urged through the grommet 12. The bearing apparatus 30 prevents the at least one conductor 28 from being damaged by the grommet 12 as the at least one conductor 28 is fed through the grommet 12. Additionally, the bearing apparatus 30 reduces an amount of force needed to draw the at least one conductor 28 through the grommet 12.

In use, the grommet 12 is positioned within the support surface 26. The at least one conductor 28 is extended through the front side 14 and the back side 16 and a selected length of the at least one conductor 28 is drawn through the grommet 12. The grommet 12 is utilized in the convention of wiring a structure. Moreover, the grommet 12 increases a service life of the at least one conductor 28 by preventing damage to the at least one conductor 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A conductor grommet assembly configured to allow a conductor to be easily passed through a surface, said assembly comprising:
    a grommet being configured to be positioned in a support surface, said grommet being configured to have at least one conductor passed therethrough such that the at least one conductor passes through the support surface, said grommet has an inner surface, a peripheral wall, a front side and a back side; and
    a bearing apparatus coupled to said grommet, said bearing apparatus being configured to engage the conductor thereby reducing a friction of the conductor against said grommet as the conductor is fed through said grommet, said bearing apparatus comprising a plurality of rollers, each of said rollers being coupled to said inner surface of said peripheral wall, said rollers comprising a first set of rollers and a second set of rollers.

2. The assembly according to claim 1, wherein said grommet has a front side, a back side and a peripheral wall extending therebetween, each of said front side and said back side being open, said grommet being substantially hollow, said peripheral wall having an outer surface and an inner surface, said outer surface having a plurality of ridges extending outwardly from said outer surface, each of said ridges being continuous and extending around said outer surface, said ridges being spaced apart from each other between said front side and said back side.

3. The assembly according to claim 2, wherein said grommet being configured to be positioned in the support surface such that said front side and said back side are each aligned with one of an inside surface and an exterior surface of the support surface, said ridges engaging said support surface such that said grommet is retained in the support surface.

4. The assembly according to claim 1, wherein, said first set of rollers is positioned adjacent to said front side, each of said first set of rollers being evenly spaced apart from and positioned on opposite sides of a longitudinal axis bisecting said grommet, said second set of rollers being positioned adjacent to said back side, each of said second set of rollers being evenly spaced apart from and positioned on opposites side of said longitudinal axis.

5. The assembly according to claim 4, wherein each of said rollers includes a pair of couplers being spaced apart and aligned with each other.

6. The assembly according to claim 4, wherein each of said rollers further comprises a shaft attached between said pair of couplers, each of said rollers further comprises a sleeve rotatably positioned around said shaft and extending between said couplers, said sleeve having an outer surface, said outer surface being configured to engage the conductor such that the sleeves rotate when the conductor is urged through said grommet.

7. A conductor grommet assembly configured to allow a conductor to be easily passed through a surface, said assembly comprising:
    a grommet having a front side, a back side and a peripheral wall extending therebetween, each of said front side and said back side being open, said grommet being substantially hollow, said peripheral wall having an outer surface and an inner surface, said outer surface having a plurality of ridges extending outwardly from said outer surface, each of said ridges being continuous and extending around said outer surface, said ridges being spaced apart from each other between said front side and said back side, said grommet being configured to be positioned in a support surface such that said front side and said back side are each aligned with one of an inside surface and an exterior surface of the support surface, said ridges engaging said support surface such that said grommet is retained in the support surface, said grommet being configured to have at least one conductor passed therethrough such that the at least one conductor passes through the support surface;
    a bearing apparatus coupled to said grommet, said bearing apparatus being configured to engage the conductor thereby reducing a friction of the conductor against said grommet as the conductor is fed through said grommet, said bearing apparatus comprising:
        a plurality of rollers, each of said rollers being coupled to said inner surface of said peripheral wall, said rollers comprising a first set of rollers and a second set of rollers, said first set of rollers being positioned adjacent to said front side, each of said first set of rollers being evenly spaced apart from and positioned on opposite sides of a longitudinal axis bisecting said grommet, said second set of rollers being positioned adjacent to said back side, each of said second set of rollers being evenly spaced apart from and positioned on opposites side of said longitudinal axis, each of said rollers including:
        a pair of couplers being spaced apart and aligned with each other;
        a shaft attached between said pair of couplers; and
        a sleeve rotatably positioned around said shaft and extending between said couplers, said sleeve having an outer surface, said outer surface being configured to engage the conductor such that the sleeves rotate when the conductor is urged through said grommet.

* * * * *